UNITED STATES PATENT OFFICE.

MICHAEL F. COUGHLIN, OF BOSTON, MASSACHUSETTS, ASSIGNOR TO AMERICAN GUM PRODUCTS COMPANY, OF COVINGTON, VIRGINIA, A CORPORATION OF VIRGINIA.

RUBBER COMPOSITION AND PROCESS OF MAKING THE SAME.

1,217,157.  Specification of Letters Patent.  Patented Feb. 27, 1917.

No Drawing.  Application filed October 21, 1916.  Serial No. 126,893.

*To all whom it may concern:*

Be it known that I, MICHAEL F. COUGHLIN, a citizen of the United States, residing at Boston, in the county of Suffolk and State of Massachusetts, have invented certain new and useful Improvements in Rubber Compositions and Processes of Making the Same, of which the following is a specification.

This invention relates to rubber compositions and processes of making the same; and it comprises a rubber composition containing rubber and a sulfite waste liquor preparation, said composition also containing, if desired, the ordinary additions to rubber compounds, such as rubber substitutes made from linseed oil, tung oil, (Chinese wood oil,) etc., asphalt, tar, blown petroleum oils, etc.; and it also comprises a method of making such compositions wherein a sulfite waste liquor preparation is incorporated into rubber together with the usual filling and vulcanizing additions; all as more fully hereinafter set forth and as claimed.

Rubber is rarely used as a pure material, most rubber goods being compounded of rubber and other things. These other things are not to be regarded as adulterants since they give the rubber different properties for various purposes. The number of materials which have been proposed for compounding with rubber for one purpose or another is almost unlimited; and the number of things which are actually used is very large. Among the favorite admixtures very largely used may be noted blown oil products made by blowing vegetable oils, such as linseed oil, rape-seed oil and the like to produce oxidized materials containing linoxin; a rather rubbery material. Other "substitutes" (most of these bodies used in compounding with rubber are called "substitutes") are made by treating these oils with sulfur chlorid, sulfur, etc. Tar, pitch and asphalt are largely used. By blowing petroleum oils with air various thickened compositions can be made of the general nature of asphalt; and these materials also are largely used. One such material, called mineral rubber, which is very largely used, is made by blowing a mixture of thick petroleum oil with gilsonite or other native asphalt. In addition to these substitutes there are of course fillers, such as zinc white, litharge, whiting, etc. Sulfur is used for vulcanizing in most cases. Of course, additions to rubber are not confined to tarry, pitchy and asphaltic products, since waxes, such as Montan wax, are also used.

All of these rubber substitutes or compounding ingredients which are used, however, are of a more or less oily, pitchy or tarry consistence; they are all materials which, like rubber, are insoluble in water. Since rubber goods must always be waterproof, it is an obvious idea that the compounding ingredients, whose amount is very often greater than that of the rubber itself, must also be insoluble in water.

I have however, and rather unexpectedly, found that certain water soluble materials may advantageously be used with rubber to give higher grade compositions than those made with many of the well known additions; and that these materials, although in and of themselves soluble in water, nevertheless give a rubber composition fully as resistant to water as the rubber itself or as rubber compositions made with the usual oily, tarry or pitchy additions. The particular materials I use are certain materials made from sulfite waste liquor.

In one of the ordinary methods of making paper pulp the wood is digested with acid sulfite of lime. Sometimes an acid sulfite made from dolomitic lime and composed of bisulfites of lime and magnesia, is used. In either event about half the wood goes into solution while the other half remains undissolved as the ordinary sulfite pulp. The nature of the components of the wood going into solution is not definitely known, but for the sake of a name they are called lignone to contradistinguish them from cellulose, which forms the paper pulp. The lignone goes into solution in the form of acid bodies containing sulfur from the bisulfite used and combined with the lime or the lime and magnesia. For the sake of a name, the dissolved matter is therefore called a lignosulfonate of these bases.

Sulfite liquor as it comes from the digester is a thin watery liquid, readily breaking up into various ill defined products. But with proper care and precautions it may be evaporated down to a thick liquid containing its organic components in substantially their original condition. These precautions include a careful neutralization and evaporation at a low temperature *in vacuo*. The concentrated liquid so formed may be further concentrated to produce dried materials, the concentration being either in the same apparatus which produced the liquid product, or, and advantageously, in separate driers.

This dried material is suitable for use in the present invention. As stated, however, in the original concentrated material and in this material the lignosulfonic acids are combined with lime or with lime and magnesia. I find that for specific purposes I may advantageously, in the present invention, replace the basic lime and magnesia by other bases; producing, for instance, lignosulfonates of alumina, of lead, of copper, of iron, etc. In so doing, the concentration of the original liquor may be interrupted when it becomes of a density of 30°–35° Bé. and the thick liquid precipitated by a sulfate of the base which is desired. Under these conditions, using copper sulfate for example, the lignosulfonate of lime and the sulfate of copper by double decomposition give insoluble sulfate of calcium and lignosulfonate of copper which remains in solution. The sulfate of calcium may be separated by decantation or filtration and the remaining liquor evaporated to dryness on a rotary drum or the like. Each of these lignosulfonates is of specific utility in the present invention; but I shall more generally hereinafter speak of the material containing the characteristic organic matters of sulfite waste liquor in combination with lime or lime and magnesia, such as occurs in commerce, or can be made as above indicated.

These dry "lignosulfonates" occur in the form of a light yellow to brownish flaky or powdered material. For using in the present invention this material is best very carefully dried and reduced to a powder. I have found that this powdered material may be readily incorporated with rubber under the ordinary conditions of milling and the like, and rubber compositions obtained from which, very strangely, water extracts substantially nothing. This is a peculiar result for the reason that all the lignosulfonates are soluble in water. Yet with rubber compositions containing relatively large proportions of this material water does not extract it. As to the reason for this, I cannot say. It may, however, be that some chemical action takes place before or during vulcanization by which the sulfite liquor solids are made insensitive to water. This, however, is merely theory. The fact is that rubber preparations can be made with large proportions of dry sulfite waste liquor which are insensitive to the action of water, acids and strong chemical reagents. And these compositions display great tensile strength; being of higher grade than other preparations containing the same amount of rubber, but without incorporation of the dry waste sulfite liquor solids.

The dry sulfite waste liquor preparation may be used in connection with rubber together with any of the usual vulcanizing and filling materials employed in making rubber goods. One particularly good composition may be made with rubber, a relatively large amount of dry sulfite waste liquor and the "mineral rubber" described; a blown petroleum product of asphaltic nature containing gilsonite or other native form of asphaltum. In my invention I work up the rubber with a dry sulfite waste liquor preparation in the ordinary apparatus. In spite of the fact that this material is of wholly different properties from rubber, incorporation goes on with ease, the sulfite liquor preparation being as readily incorporated as the usual more or less oily or tarry bodies.

As exemplificatory of my invention I may adduce one composition made by working together 35 parts of ordinary commercial dry sulfite waste liquor with 20 parts of ordinary plantation rubber, 43 parts of mineral fillers and 2 parts of sulfur. This composition exhibited a tensile strength of no less than 450 pounds. The filler was composed of 15 parts of zinc white, 18 parts of whiting and 10 parts of litharge. After incorporation the mixture was given a light vulcanization. A parallel mixture made in the same way but substituting the ordinary commercial "white substitute" (an oxidized rape oil product) for the dry sulfite waste liquor in the same amount was absolutely worthless, being vesicular, rotten and having no tensile strength to speak of. The amount of rubber in the two compositions was the same and the same fillers and the same amount of sulfur were employed; the one difference being in the use of 35 per cent. of dry sulfite waste liquor in lieu of the same amount of white substitute. White substitute is one of the commonest of additions to rubber goods.

A third composition made by replacing part of the white substitute by dry sulfite waste liquor (25 parts of dry sulfite waste liquor and 10 parts of white substitute) gave an excellent rubber composition with a tensile strength of 357 pounds. These three compositions were made in the same way.

In another composition containing 25 per cent. sulfite waste liquor preparations I used 10 parts of the stated mineral rubber, 25 parts of commercial dry sulfite waste liquor, 20 parts of rubber, 43 parts of the same fillers and 2 parts of sulfur. This also gave me an excellent rubber composition with a tensile strength of 368 pounds. The treatment was the same as before. On increasing the amount of rubber in these compositions the tensile strength and the quality of course went up; but the resulting compounds were better than could be formed from the same amount of rubber and the other materials usually compounded with rubber but without the dried sulfite waste liquor. In one such material I used 50 parts of rubber, 25 parts of dry sulfite waste liquor and 23 parts of fillers (12 parts litharge, 5 parts whiting and 6 parts of zinc white) with 2 parts sulfur for vulcanizing. This gave me a material with a tensile strength of 789 pounds.

I find that for many purposes an excellent composition can be made by the use of both mineral rubber and sulfite waste liquor in the combination; the composition having more strength than the sum of the strengths of the rubber with mineral rubber and the rubber with waste sulfite liquor.

I regard my invention as comprising any composition containing rubber and the dry characteristic organic solid matters of waste sulfite liquor, such solid matters being combined with a suitable base. The composition may also contain any of the other bodies customarily used in compounding rubber for rubber goods; and may be vulcanized to any degree desired by any suitable process of vulcanization.

What I claim is:—

1. A rubber composition comprising rubber and sulfite waste liquor solids.

2. A rubber composition comprising rubber, dry sulfite waste liquor solids and a composition of blown petroleum and asphalt.

3. The process of making rubber compositions which comprises working together rubber and a dry sulfite waste liquor preparation.

4. The process of making rubber compositions which comprises working together rubber, a dry sulfite waste liquor preparation and other body-giving materials.

5. The process of making rubber compositions which comprises working together rubber, a dry sulfite waste liquor preparation, a composition of blown petroleum and asphalt, and other body-giving components.

6. The process of making rubber compositions which comprises working together rubber and a dry sulfite waste liquor preparation and vulcanizing the composition so obtained.

7. The process of making rubber compositions which comprises working together rubber, a dry sulfite waste liquor preparation and other body-giving materials and vulcanizing the composition so obtained.

8. The process of making rubber compositions which comprises working together rubber, a dry sulfite waste liquor preparation, a composition of blown petroleum and asphalt, and other body-giving components and vulcanizing the composition so obtained.

In testimony whereof, I affix my signature.

MICHAEL F. COUGHLIN.